United States Patent [19]

Carr

[11] 4,088,037
[45] May 9, 1978

[54] TRANSMISSION SYSTEM

[75] Inventor: Thomas M. Carr, Ardmore, Pa.

[73] Assignee: Philip Lunney, Ardmore, Pa.

[21] Appl. No.: 709,702

[22] Filed: Jul. 29, 1976

[51] Int. Cl.² ............................................. F16H 3/08
[52] U.S. Cl. .................................. 74/371; 192/48.91; 74/339
[58] Field of Search ................ 74/343, 360, 371, 372, 74/344, 339; 192/48.9, 48.91, 93 C

[56] References Cited

U.S. PATENT DOCUMENTS

| 1,102,427 | 7/1914 | Morgan | 74/372 |
| 1,664,303 | 3/1928 | Mayer | 74/371 X |
| 2,062,195 | 11/1936 | Smith | 192/48.91 |

Primary Examiner—Samuel Scott
Assistant Examiner—Frank H. McKenzie, Jr.
Attorney, Agent, or Firm—Stanley Bilker

[57] ABSTRACT

An improved transmission shift mechanism which incorporates both a combined synchronizing clutch and a positive engagement system for coupling and decoupling gear elements within a transmission frame. The synchronizing clutch mechanism has a plurality of circumferentially spaced latch members which are radially displaceable for frictional circumferential engagement with the inner walls of a gear member having a central bore opening. The positive engagement system is a locking unit which includes circumferentially spaced spherical elements which are also radially reciprocal for seating within corresponding recesses within the bore of the gears. The frictional engagement members and the positive locking ball elements are cooperatively actuated through contoured cam surface elements which are longitudinally displaceable within the sliding member responsive to manual operation of an extension rod in the longitudinal direction.

16 Claims, 7 Drawing Figures

TRANSMISSION SYSTEM

BACKGROUND OF THE INVENTION

1. Field of the Invention

This invention pertains to improved transmission systems. In particular this invention relates to a positive locking gear shift mechanism for coupling and decoupling gear members having different gear ratios. More in particular, this invention relates to synchronizing clutch mechanisms which utilize frictional engagement members to provide synchronization between the different gears. Still further, this invention relates to a combined synchronization and positive engagement shifting unit operable from an extension rod which may be displaced in a reversible longitudinal direction. Yet further, this invention especially pertains to an improved transmission system which provides for cooperative cam actuation of both a synchronizing clutch device and a positive engaging device.

2. Prior Art

Gear shift devices and synchronized clutches are known in the art. Additionally, positive gear shift devices are also well known in the art. However, in some prior systems separate non-cooperating mechanisms are used to attain gear shifting and clutch synchronization. This provides for complex hardware and increased manufacturing costs for such prior transmission systems.

In other prior transmission systems, ball elements are utilized for engagement with recesses in gears to provide for positive engagement by the shift devices. However, in such prior systems, the displacement of the ball elements is not performed in conjunction with synchronizing clutch elements, wherein both are moved by interaction with a contoured cam surface. Such prior art separate shift and synchronizing devices had the effect of providing for a complex kinematic relation having a lower reliability in use.

SUMMARY OF THE INVENTION

An improved transmission system which includes at least a pair of rotatable gears having longitudinally registering bores and recesses formed within an inner wall of the gears defined by the bores. Additionally, the improved transmission system includes a shift and clutch mechanism which is slidably actuated within the bores for (1) frictionally engaging the shift and clutch mechanism to the inner wall of one of the gears responsive to a linear displacement of the shift and clutch mechanism as well as for (2) positive engagement of the shift and clutch mechanism to one of the gears when the shift and clutch mechanism is linearly displaced through a predetermined linear displacement within the bores.

DESCRIPTION OF THE PREFERRED EMBODIMENTS

Figure 1:
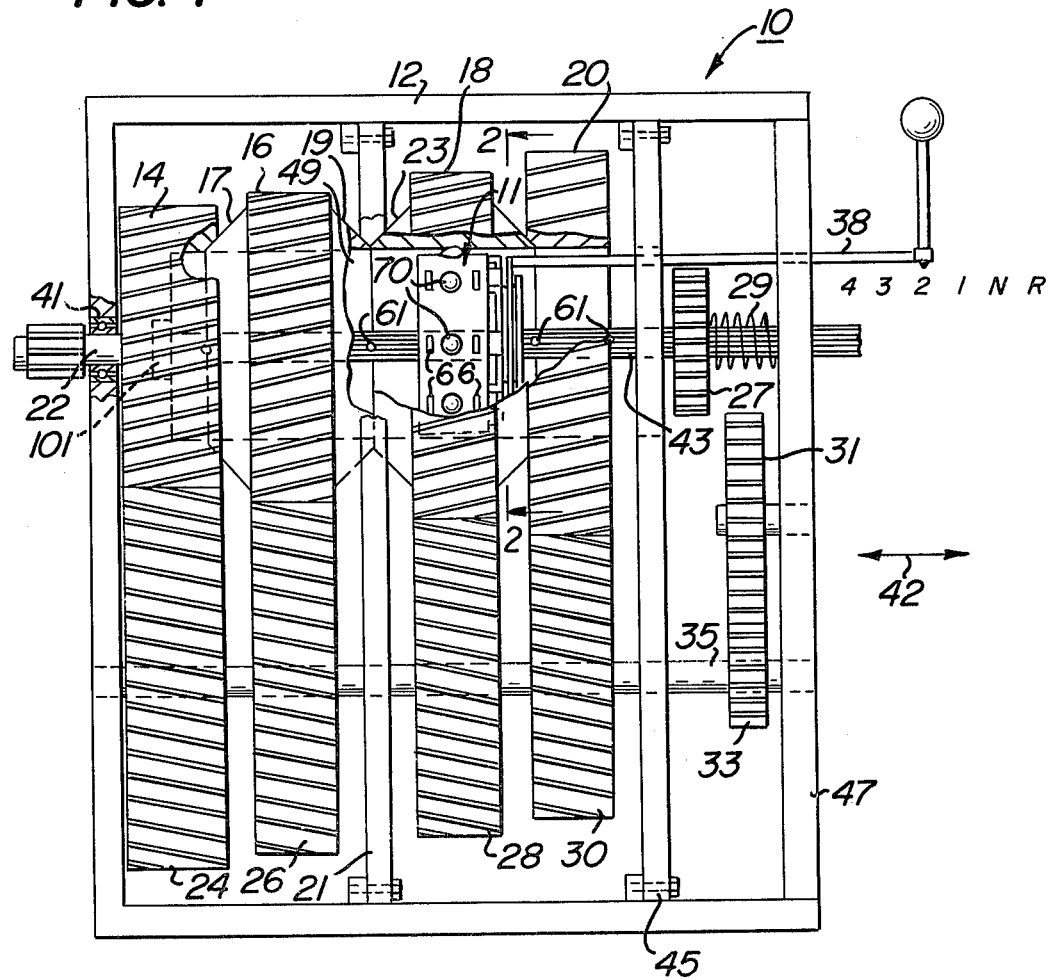
FIG. 1 is an elevation view partial cut-away of the improved transmission system within a transmission frame.

Referring now to FIGS. 1-4, there is shown improved transmission system 10 which incorporates both the combined mode of operation of a synchronizing clutch and a positive engagement shifting mechanism. In overall concept, transmission system 10 may be utilized in conjunction with transmission box 12 to provide actuation and/or deactuation of a plurality of gear members 14, 16, 18 and 20. As shown in FIG. 1, within transmission frame 12, gear member 14 is a drive gear which is directly coupled to drive shaft 22 through bearing 41. Thus, rotation of drive shaft 22 causes a corresponding rotation of drive gear 14 in a 1:1 ratio. As will be seen in following paragraphs, linear actuation of improved shift and clutch mechanism 11 provides for coupling and/or decoupling of gears 14, 16, 18, and 20 to shaft member 43.

Shaft 43 is splined and is freely rotatable independent of the rotation of drive shaft 22. Splined shaft 43 passes through end wall 47, plate members 45 and 21 and may be mounted rotationally within drive gear 14 through a bearing 101. Splining of shaft 43 permits rotational coupling between shaft member 43 and a corresponding gear member 14, 16, 18 or 20 dependent upon which of these gears is lockingly engaged to improved shift and clutch mechanism 11.

Gears 14, 16, 18, and 20 generally correspond to the standard shift nomenclature of fourth gear, third gear, second gear, and first gear respectively. Gear member 14, as has been described, is directly coupled to drive shaft 22 and correspondingly rotates at all times when drive shaft 22 is in a rotational displacement mode of operation. Driven gears 24, 26, 28 and 30 are secured in rigid constraintment to counter shaft 35. Additionally, each of gears 24, 26, 28 and 30 are matingly interfaced with gear elements 14, 16, 18, and 20 respectively. Rotation of driven gear 14 causes a counter rotation of gear member 24 which in turn continually causes a rotational displacement of counter shaft 35 and gear members 26, 28 and 30. Thus, it will be understood that rotation of drive gear 14 responsive to a corresponding rotation of drive shaft 22 will cause continual rotation of gear member 16, 18 and 20 through mating interface of these gears with gear element 26, 28 and 30. Thus, during rotation of drive shaft 22, each of gears 14, 16, 18 and 20 will be placed in a rotational displacement mode of operation whether or not a particular gear is coupled to spline-shaft 43.

Drive gear member or fourth gear 14 includes a truncated conical seat 15 within which is matingly engaged truncated conical bearing surface 17 of third gear or gear element 16. As is clearly seen in FIG. 1, opposing conical bearing surface 19 of gear member 16 engages a seat formed within plate element 21 which is secured to transmission frame 12. Gear member 18 also includes opposingly directed conical bearing surfaces 23 and 25 which respectively slidingly engage conical seats formed in plate 21 and gear member 20. Each of gears 14, 16, 18, and 20 include linearly aligned bores 44 to provide a linearly directed tunnel 49 within which improved shift and clutch mechanism 11 is reversibly moved in longitudinal direction 42.

Reverse gear is obtained by longitudinal displacement of gear element 27 into mating engagement with gear member 31. It will be noted that gear element 27 is biased from end wall 47 of frame 12 through compression spring 29. Thus, rotation of counter shaft 35 causes a corresponding rotation of gear member 33 which is rigidly mounted or secured to shaft 35 and matingly interfaces with gear 31 which is rotationally mounted to end wall 47 through a bearing member not important to the inventive concept as is herein described. Thus rotation of driven shaft 22 in a particular direction causes a counter rotation of splined shaft 43 when gear member 27 is placed into mating interface with gear element 31.

Referring to FIG. 1, improved transmission system 10 is operationally activated by stick shift or extension rod 38 which is moveably displaced in linear or longitudinal direction 42. Rod 38 is rigidly secured to improved clutch and shift mechanism 11 and is rotationally fixed independent of the rotation of gear members 14, 16, 18 and 20. Extension rod 38 passes in longitudinal direction 42 through end wall 47 and is connected to mechanism 11 within longitudinally extending tunnel 49 as is seen. Thus, longitudinal movement of extension rod 38 has the resulting effect of displacing shift and clutch mechanism 11 through a corresponding longitudinal motion from one of gears 14, 16, 18 or 20 to another one of such gear members.

Each of gear members 14, 16, 18 and 20 are thus continually rotatable responsive to the rotation of driven shaft 22 and include longitudinally registering bores 44 of sufficient diameter to define tunnel 49 which allows longitudinal movement of improved shift and clutch mechanism 11 therethrough. Each of gear members 14, 16, 18 and 20 further include a plurality of circumferentially spaced recesses 46 formed within inner wall 48 defined by linearly or longitudinally directed and aligned bores 44. Recesses 46 are generally hemispherical in nature to lockingly engage shift and clutch mechanism elements to be described in following paragraphs. However, the particular geometric contour of recesses 46 is not important to the inventive concept as is herein defined with the exception that they be of such contour as to accept shifting elements in a positive locking engagement mode of operation. Thus, as has been described, improved shift and clutch mechanism 11 may be passed or displaced through tunnel 49 of longitudinally registering aligned bores 44 in gear members 14, 16, 18 and 20 to permit coupling and decoupling of a particular gear element 14, 16, 18 and 20 to splined shaft 43.

Shift and clutch mechanism 11 is operationally activated by slidable actuation within longitudinally aligned bores 44 for (1) frictional engagement of shift and clutch mechanism 11 to gear inner wall 48 responsive to linear displacement of shift and clutch mechanism 11 by longitudinal displacement of extension rod 38, and (2) positive engagement of shift and clutch mechanism 11 to at least one of gears 14, 16, 18 and 20 when shift and clutch mechanism 11 is displaced through a predetermined longitudinal displacement within aligned bores 44. This has the effect of providing both a positive engagement unit and a synchronizing clutch mechanism for the improved shift and clutch mechanism 11.

Figure 4:
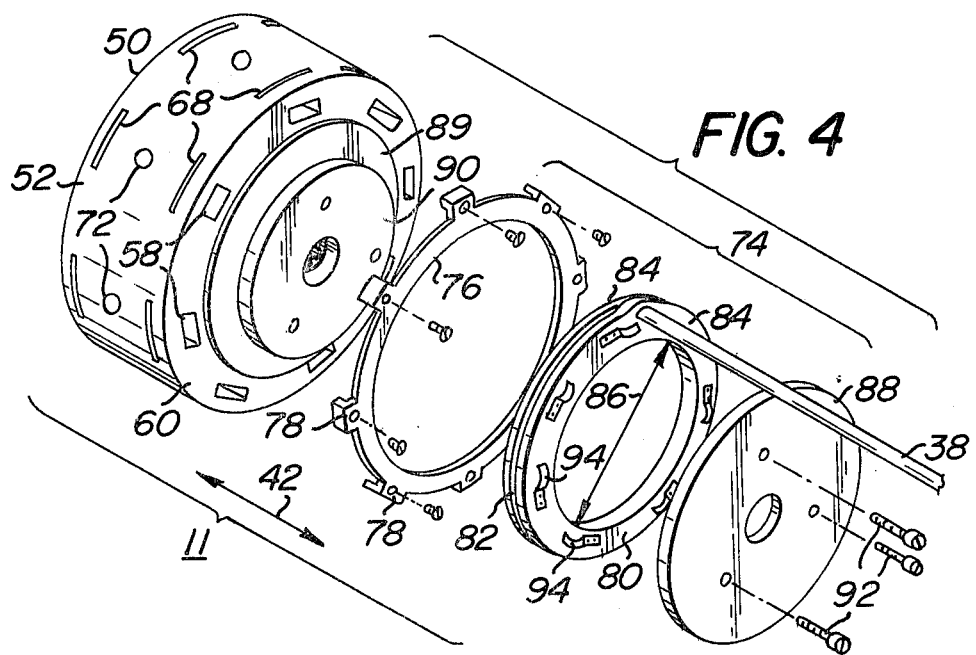
FIG. 4 is a perspective, exploded view of the shift and clutch mechanism.
Figure 2:
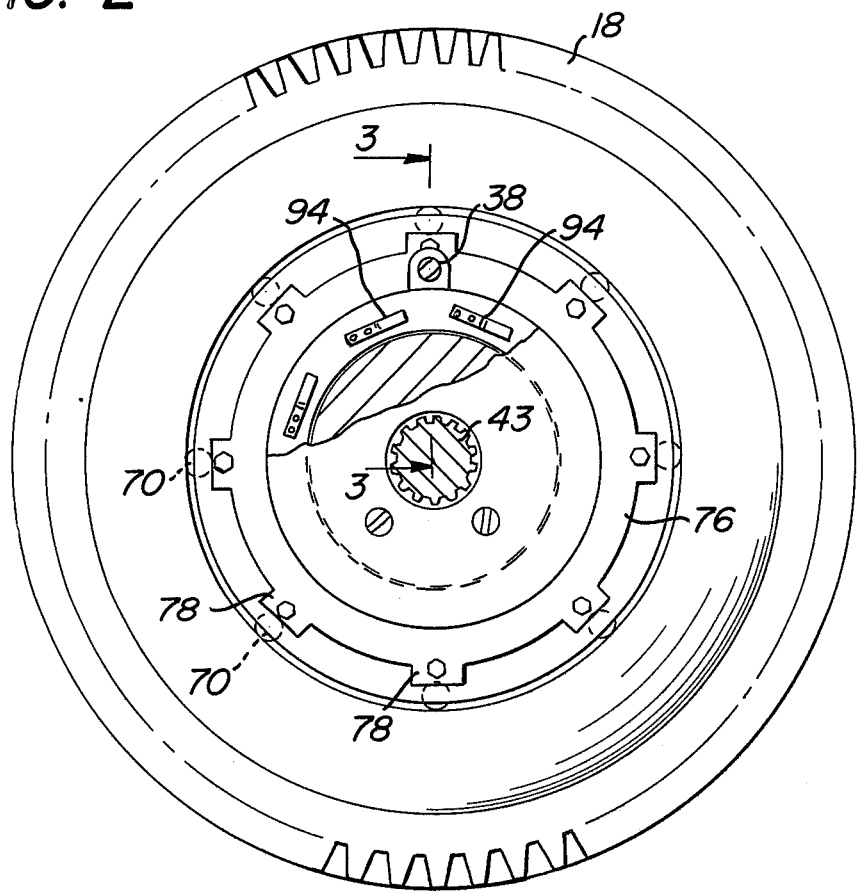
FIG. 2 is an elevation view of the shift and clutch mechanism taken along the section lines 2—2 of FIG. 1.
Figure 3:
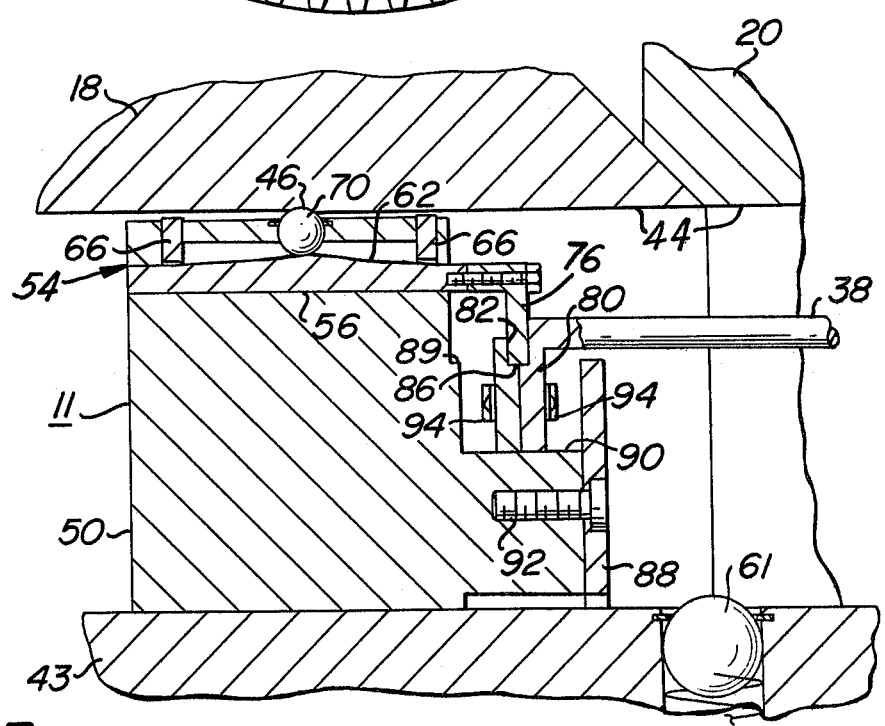
FIG. 3 is a cross sectional view of the shift and clutch mechanism taken along the section lines 3—3 of FIG. 2.
Figure 5:
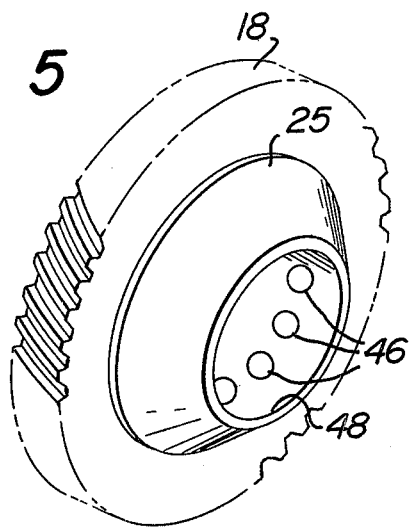
FIG. 5 is a perspective view of a gear adapted to receive the shift and clutch mechanism.

Referring now to FIG. 4, shift and clutch mechanism 11 includes cylindrical reciprocably displaceable member 50 which is adapted to be slidably displaced within aligned bores 44 or tunnel 49 formed within gears 14, 16, 18 and 20 in longitudinal direction 42. Cylindrical displacement member 50 includes circumferential side wall 52 which in operation interfaces and slidingly engages inner walls 48 of gear members 14, 16, 18 and 20. Thus, in overall geometric contour, displacement member 50 may be seen to be in the form of a cylindrical disk having a predetermined diameter substantially equal to but slightly less than the diameter of longitudinally aligned bores 44. Further, cylindrical displacement member 50 includes an extended length in linear direction 42 for provision of moveable devices inserted therein to provide both the positive locking shift operation as well as frictional engagement with the inner walls 48 of gears 14, 16, 18, and 20 for synchronized clutching operation.

Figure 6:
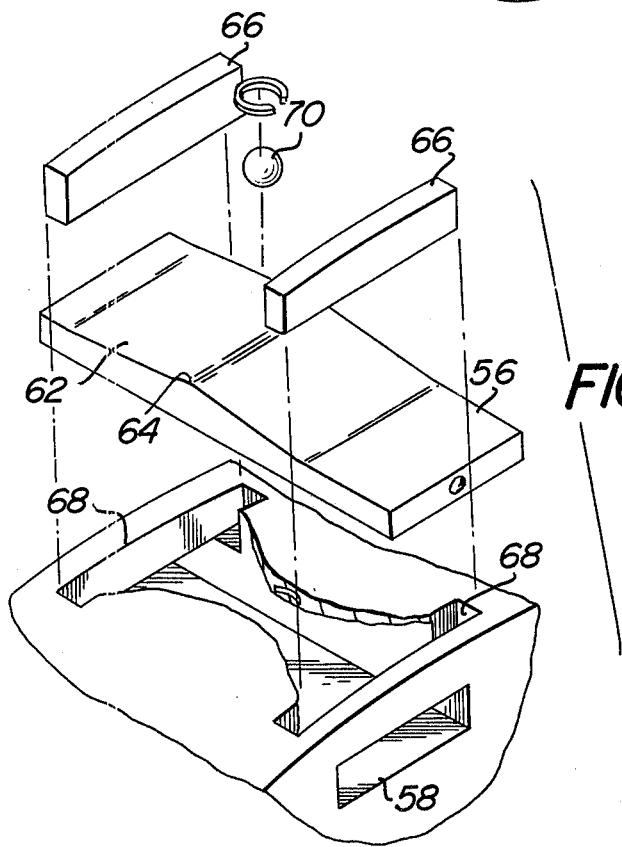
FIG. 6 is an exploded view of the gear engagement mechanism.

Gear engagement mechanism 54 as shown in FIG. 6, is located within cylinder member 50. Mechanism 54 is adapted to provide for partial radial displacement of elements contained therein, with respect to an axis of cylindrical displacement member 50, external to circumferential wall 52 and responsive to a displacement in longitudinal direction 42 of shift and clutch mechanism 11. Gear engagement mechanism 54 has as an operating element, cam or contoured lug member 56 formed within or internal to displacement member 50 and which is longitudinally or linearly displaceable in direction 42.

Cam or lug member 56 may be mounted within a track member or other trough type longitudinally directed recess in order to allow cyclic or reversible motion in longitudinal direction 42 while constraining other types of motion of cam member 56 with respect to cylindrical displacement member 50. Displaceable cylinder 50 includes end wall 60 lying in a plane substantially normal to the plane of circumferential wall 52 and includes a plurality of cam slots 58 through which cam or lug member 56 may be partially displaced.

Thus, cam slots 58 form a substantially but not necessarily rectangular geometric contour of sufficient cross-sectional area to permit partial extension of lug members 56 in longitudinal direction 42 external to displacement member end wall 60.

Cam or lug members 56 have symmetrically contoured inclined upper surfaces 62 with apex 64 provided at a substantially center point of lug member 52 in the extended direction 42. As is seen from FIG. 3, lug member upper surface 62 is substantially bell-shaped in contour when taken in a cross section view normal or perpendicular to the extension of lug member 56 is direction 42.

The synchronization clutch mode of operation between the gears is provided by frictional engagement elements or latches 66 which are slidably mounted on cam member 56 and are radially extendable external to circumferential side wall 52 of cylinder 50 responsive to a displacement in longitudinal direction 42 of lug member 56. Frictional engagement elements 66 are slidable on inclined upper surface 62 of cam member 56. Frictional element slots 68 are formed in circumferential side wall 52 in order to provide an opening whereby frictional engagement elements 66 may be partially extended in the radial direction partially external to cylindrical displacement member 50.

As is seen, when lug member 56 is moved in longitudinal direction 42, latch elements 66 which are constrained from movement in direction 42, begin to move in a radial direction as they slide up or down inclined upper surface 62. Thus, as cam member 56 is moveably displaced in direction 42 there is a responsive radial movement of latch elements 66 in a radial direction. Further, as will be seen in following paragraphs, once a predetermined motion of cam members 56 is initiated, the entire cylindrical displacement 50 is moveably displaced in direction 42 and may move member 50 from aligned position with one of gears 14, 16, 18 and 20 to another gear member with the engagement elements 66 forming a frictional contact with a corresponding gear inner wall 48 to provide a synchronizing effect.

In addition to the frictional engagement elements 66 which are slidably mounted on cam members 56, there is provided positive locking elements 70 which in themselves are moveable on cam member 56 and are radially extendable external to circumferential wall 52 of cylinder member 50 responsive to displacement in longitudinal direction 42 of lug member 56.

Positive locking elements 70 are adapted to reversibly pass through lock element openings 72 formed in circumferential wall 52 of cylindrical displacement member 50. Locking elements 70 are generally spherical members adapted to engage recesses 46 within gear inner walls 48 responsive to a predetermined longitudinal displacement of cam member 56. It will be noted, that lock element openings 72 are generally slightly greater in diameter than the overall diameter of spherical ball elements 70 to emerge in a radial direction from lateral side wall 52. Since member 50 is maintained at all times within tunnel 49, ball elements 70 are constrained to only partial emergence from cylinder 50.

When spherical elements 70 are inserted into recesses 46 of gear inner walls 48, positive locking is attained. As is clearly evident, maximum radial extension of locking elements 70 external to circumferential side wall 52 of member 50 occurs when ball members 70 are contiguous with apex 64 of lug member 56. Reversible movement in direction 42 from that point permits disengagement of ball members 70 from recesses 46.

Reversible longitudinal displacements of both cylindrical displacement member 50 and gear engagement mechanism 54 is provided by gear engagement movement mechanism 74. In overall concept, as will be shown in following paragraphs, gear engagement movement or displacement mechanism 74 is fixedly secured to cam or lug members 56 and is generally rotatable in coincident relation with respect to cylindrical displacement member 50.

Gear engagement displacement mechanism 74 includes connector element 76 which is annularly contoured and includes a connector inner diameter and a plurality of finger or extension members 78 passing radially from an external diameter surface. Finger or attachment elements 78 are fixedly secured to an end surface of cam member 56 through bolts, threaded connections or some like fixed attachment. Thus, as is seen, as connector element 76 is moveably displaced in longitudinal direction 42, cam or lug member 56 is responsively moved through a similar directional displacement.

Gear engagement displacement mechanism 74 further includes manual operation device 80 which, as will be shown, is secured to connector element 76 for longitudinal displacement of both manual operation device 80 and connector element 76 in a fixed and constrained relation each to the other in direction 42.

However, as will further be shown, connector element 76 is rotatable with respect to manual operation device 80. This will have the effect of allowing rotation of both the connector element 76 and displacement member 50 while allowing manual operation device 80 and extension rod 38 to remain in a rotatably fixed location.

In construction, manual operation device 80 is annularly contoured in a manner similar to the overall contour of connector element 76. Further, manual operation device 80 includes peripheral groove 82 formed between opposing cylindrical disk elements 84 to provide a pulley like member. Peripheral groove 82 is thus formed in a lateral wall of manual operation device 80 and is adapted for slidable insert of the inner surface defined by the inner diameter of connector element 76. More in particular, peripheral groove 82 provides for a circular trough like recess within which connector element 76 may rotatably slide. Thus, manual operation device 80 and rod 38 may remain rotatably fixed while connector element 76 and secured displacement member 50 are correspondingly moved.

Displacement of manual operation device 80 in longitudinal direction 42 is seen to be actuated through extension rod 38 which is fixedly secured to annular side wall 84 of ring or manual operation device 80 for longitudinal displacement of connector element 76.

Inner diameter 86 of manual operation device 80 is of sufficient magnitude to slidingly engage cylindrical projection 90 between fixed plates or flange members 88 and 89 each having an outer diameter greater than the internal diameter 86 of element 80. Flange member 88 is mounted to the end of cylindrical projection 90 through bolt members 92 or some like mechanism not important to the inventive concept as is herein described. Thus, both connector element 76 and annular manual operation device 80 are captured between flange members 88 and 89.

In operation, assuming locking engagement of cylinder 50 within one of gears 14, 16, 18 and 20 each of the balls 70 is positionally mounted on apex 64 of cam 56 and extends into a corresponding recess 46 of one of the gears. Initial movement of rod 38 moves manual operation device 80 which in turn causes a corresponding longitudinal displacement of annular ring 76. Ring 76 in fixed securement to cams 56 results in linear displacement of lug members 56 until springs 94 abut against an adjacent surface of flange 88, or 89 dependent upon whether the operator is upshifting or downshifting. This has the effect of displacing apex 64 a sufficient distance such that ball elements 70 drop into the cylinder but remaining in contact with inclined upper surface 62. This effects locking disengagement between cylinder 50 and gears 14, 16, 18 and 20.

Figure 7:
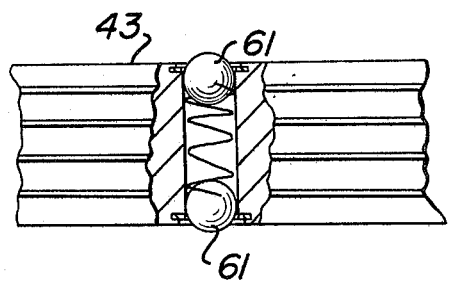
FIG. 7 is a partial cut-away view of spring loaded ball elements within the splined shaft.

Further movement of rod 38 longitudinally displaces cylinder 50 until balls 61 in shaft 43 are abutted. During this movement there is no relative motion between cams 56 and cylinder 50. Ball elements 61 are mounted in a splined shaft 43 as is shown in both FIGS. 3 and 7. Balls 61 are longitudinally spaced along splined shaft 43 corresponding to the interface between adjacent gears 14, 16, 18 and 20, and are biased in a radial outward manner by a compression spring or some like means to extend partially from a peripheral surface of shaft 43. Appropriate C-ring retainers maintain the balls 61 in constrainment with splined shaft 43. These balls 61 provide for frictional resistance applied to cylinder 50 in order that further relative motion of cams 56 with respect to cylinder 50 may be attained.

Once one of the faces cylinder 50 is abutting balls 61, further movement of cylinder 50 is frictionally impeded. However, cam 56 can be moved relative to cylinder 50 through compression of springs 94. As cams 56 are displaced longitudinally, latch members 66 are displaced radially as they ride up an inclined surface 62. It is to be understood that balls 61 are positioned to afford proper timing for frictional engagement of latch members 66 with the inner wall 48 of a next succeeding gear member to be synchronized.

Further displacement of rod 38 causes cylinder 50 to correspondingly move. During this interval there is no relative movement between cams 56 and cylinder 50. When rod 38 is displaced to a predetermined location corresponding to an indicated gear, apices 64 of cams 56 are in registration with circumferentially spaced recesses 46 of the indicated gear. However, balls 70 are resting on the apices 64 but are positioned in the inclined slope of surface 62. At this position, springs 94 expand to cause cylinder 50 to follow the cams 56 thereby driving balls 70 upon the apices 64 and into locking engagement within recesses 46 of the indicated gear. As is evident from the description, synchronization is automatically effected without the need for a separate clutch mechanism.

What is claimed:

1. An improved transmission system including:
   (a) at least a pair of rotatable gears having longitudinally registering bores and recesses formed within an inner wall of said gears defined by said bores; and,
   (b) shift and clutch means slideably actuated within said bores for providing in sequence (1) frictional engagement of said shift and clutch means to said inner wall of one of said gears to effect synchronization thereof responsive to longitudinal displacement of said shift and clutch means, and then (2) positive engagement of said shift and clutch means to one of said gears when said shift and clutch means is longitudinally displaced through a predetermined linear displacement within said bores.

2. The improved transmission system as recited in claim 1 wherein said shift and clutch means includes:
   (a) A cylindrical displacement member adapted to be slideably displaced within said aligned bores of said rotatable gear members, said displacement member having a circumferential side wall interfacing said inner walls of said gear members; and,
   (b) gear engagement means within said displacement member for partial radial displacement external said circumferential side wall responsive to said longitudinal displacement of said shift and clutch means.

3. The improved transmission system as recited in claim 2 where said gear engagement means includes:
   (a) cam means within said displacement member and longitudinally displaceable with respect thereto;
   (b) frictional engagement means slideable on said cam means and radially extendable external to said side wall of said cylindrical displacement member responsive to said longitudinal displacement of said cam means; and,
   (c) positive locking means moveable on said cam means and radially extensible external said side wall of said displacement member responsive to said longitudinal displacement of said cam means.

4. The improved transmission system as recited in claim 3 where said cam means includes an extended lug member having symmetrically contoured inclined upper surface having an apex at substantially a center point of said lug member extension.

5. The improved transmission system as recited in claim 4 where said lug member upper surface includes a substantially bell-shaped contour in cross-section normal to said extension of said lug member.

6. The improved transmission system as recited in claim 3 where said frictional engagement means includes a friction element slideable on an inclined upper surface of said cam means adapted to reversibly pass radially through a slot formed in said side wall of said displacement member responsive to movement of said cam means.

7. The improved transmission system as recited in claim 6 wherein said friction element is adapted to frictionally engage said inner wall of at least one of said gears subsequent to a predetermined slideable displacement of said displacement member within said aligned bores.

8. The improved transmission system as recited in claim 3 where said positive locking means includes a locking element moveable on an inclined upper surface of said cam means and adapted to reversibly pass through an opening in said displacement member for insertion into one of said recesses formed within said inner walls of said gear members.

9. The improved transmission system as recited in claim 8 where said locking element is a spherical member adapted to engage said recess responsive to a predetermined longitudinal displacement of said cam means.

10. The improved transmission system as recited in claim 3 including gear engagement movement means secured to said cam means, said gear engagement movement means being rotatable in coincident relation with respect to said cylindrical displacement member.

11. The improved transmission system as recited in claim 10 where said gear engagement movement means includes:
    (a) a connector element secured in fixed relation to said cam means within said displacement member; and,
    (b) manual operation means being secured to said connector element for longitudinal displacement of said manual operation means and said connector element in fixed relation, said connector element being rotatable with respect to said manual operation means.

12. The improved transmission system as recited in claim 11 where said connector element is annularly contoured having a connector inner diameter and at least one cam means attachment element passing radially from an external diameter surface.

13. The improved transmission system as recited in claim 12 where said cam means attachment element is fixedly secured to an end surface of said cam means.

14. The improved transmission system as recited in claim 12 where said manual operation means is annularly contoured having a peripheral groove formed in a lateral wall and adapted for slideable insert of said connector element.

15. The improved transmission system as recited in claim 14 where said manual operation means is linearly constrained to said connector element, said manual operation means being rotationally fixed.

16. The improved transmission system as recited in claim 14 where said manual operation means includes a linearly directed extension rod member fixedly secured to said annular contour of said manual operation means for longitudinal displacement of said connector element and said manual operation means.

* * * * *